United States Patent
Wu et al.

(10) Patent No.: US 9,241,361 B2
(45) Date of Patent: Jan. 19, 2016

(54) METHOD FOR HANDLING DEVICE TO DEVICE COMMUNICATION AND RELATED COMMUNICATION DEVICE

(71) Applicant: HTC Corporation, Taoyuan County (TW)

(72) Inventors: Chih-Hsiang Wu, Taoyuan County (TW); Ching-Yu Liao, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 61 days.

(21) Appl. No.: 14/141,479

(22) Filed: Dec. 27, 2013

(65) Prior Publication Data

US 2014/0187165 A1 Jul. 3, 2014

Related U.S. Application Data

(60) Provisional application No. 61/746,127, filed on Dec. 27, 2012.

(51) Int. Cl.
*H04W 76/02* (2009.01)
*H04W 72/04* (2009.01)
*H04W 76/04* (2009.01)

(52) U.S. Cl.
CPC ........ *H04W 76/023* (2013.01); *H04W 72/0406* (2013.01); *H04W 76/025* (2013.01); *H04W 76/043* (2013.01)

(58) Field of Classification Search
None
See application file for complete search history.

(56) References Cited

U.S. PATENT DOCUMENTS

| 2012/0120885 A1* | 5/2012 | Wang et al. | 370/329 |
| 2014/0153390 A1* | 6/2014 | Ishii et al. | 370/230 |
| 2015/0019339 A1* | 1/2015 | Van Phan et al. | 705/14.58 |

FOREIGN PATENT DOCUMENTS

| EP | 2701427 A1 | 2/2014 |
| WO | 2010102668 A1 | 9/2010 |
| WO | 2012144320 A1 | 10/2012 |
| WO | 2012166969 A1 | 12/2012 |

OTHER PUBLICATIONS

3GPP TS 36.300 v11.3.0, Sep. 2012.
3GPP TR 22.803 v1.0.0, Aug. 2012.
3GPP TS 36.331 v11.1.0, Sep. 2012.
3GPP TS 36.321 v.11.0.0, Sep. 2012.
European patent application No. 13020138.7, European application filing date: Dec. 27, 2013, European Search Report mailing date: Jun. 20, 2014.

(Continued)

*Primary Examiner* — Alejandro Rivero
(74) *Attorney, Agent, or Firm* — Winston Hsu; Scott Margo

(57) ABSTRACT

A method of handling device to device communication for a first user equipment (UE) in a wireless communication system includes establishing a Radio Resource Control (RRC) connection to a network of the wireless communication system; and receiving a first RRC message indicating to the first UE to use a first data radio bearer (DRB) for a proximity-based services (ProSe) communication with a second UE of the wireless communication system, wherein the first DRB is different from a second DRB for communication between the first UE and the network.

11 Claims, 9 Drawing Sheets

(56) References Cited

OTHER PUBLICATIONS

3GPP TS 36.300 V10.3.0 (Mar. 2011), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", XP050477175, pp. 1-197.

Gábor Fodor et al., "Design Aspects of Network Assisted Device-to-Device Communications", Mar. 2012, pp. 170-177, vol. 50, No. 3, IEEE Communications Magazine.

Office action mailed on Jun. 27, 2014 for the European application No. 13020138.7, filing date Dec. 27, 2013, p. 1-8.

Office action mailed on Sep. 21, 2015 for the European application No. 13020138.7, p. 1-9.

* cited by examiner

METHOD FOR HANDLING DEVICE TO DEVICE COMMUNICATION AND RELATED COMMUNICATION DEVICE

CROSS REFERENCE TO RELATED APPLICATIONS

This application claims the benefit of U.S. Provisional Application No. 61/746,127, filed on Dec. 27, 2012 and entitled "Method and Apparatus for LTE UE to UE communication in a wireless communication system", the contents of which are incorporated herein in their entirety.

BACKGROUND OF THE INVENTION

1. Field of the Invention

The present invention relates to a method utilized in a wireless communication and communication device thereof, and more particularly, to a method for handling device to device communication in a wireless communication system and communication device thereof.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNEs) for communicating with multiple user equipments (UEs), and communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Please refer to FIG. 1, which is a schematic diagram of a wireless communication system 10 according to the prior art. The wireless communication system includes a network 100 and two UEs 102 and 104. The network 100 may include one or more eNBs 1002 and 1004 which connect the UEs 102 and 104, respectively. In an LTE or LTE-A system, when two UEs communicate with each other, their data path (user plane) goes via the network, even if the two UEs are in close proximity. For example, when the UE 102 needs to transmit data to the UE 104, the UE 102 sends data via the network 100 and the UE 104 receives data via the network 100. In other words, the network 100 receives data from the UE 102 and transmits data to the UE 104. Such procedure is similar to forwarding operation. The typical data path for this type of communication is shown in FIG. 1, where eNB(s) (e.g. eNBs 1002 and 1004) and/or gateways (e.g. serving gateway/packet data network gateway (SGW/PGW) 1000) are involved. UEs which perform this type of communication are said to be in a UE-to-eNB (i.e. UE-to-network) communication mode. However, when the UE 102 and the UE 104 are in close proximity, forwarding data through the network 100 is unnecessary, which wastes the radio resource and causes signal overhead in the network 100.

The specification of 3GPP Rel-11 defines that if UEs are in proximity of each other, they may be able to use a direct data path or a locally-routed data path to communicate with each other. The UEs which perform this type of communication, i.e. a Proximity-based Services (ProSe) communication or a device to device communication, are said to be in a ProSe communication mode or a UE-to-UE communication mode. In the direct data path, the user plane data between the UEs is not traversing any network node. Examples of the direct data path and the locally-routed data path are shown in FIG. 2 and FIG. 3, respectively.

In the prior art, a first UE and a second UE communicate with each other directly via ProSe communication in data path and/or control path. In the meantime, the first UE may have a Radio Resource Control (RRC) connection with an eNB. Nevertheless, it is unknown about how to transmit data from the first UE to the second UE and the eNB.

Thus, how to handle the device to device communication appropriately is a topic to be addressed and discussed in the industry.

SUMMARY OF THE INVENTION

The present invention therefore provides a method and related communication device for handling device to device communication so that the network and the UEs can properly communicate with each other.

The present invention discloses a method of handling device to device communication for a first user equipment (UE) in a wireless communication system. The method includes establishing a Radio Resource Control (RRC) connection to a network of the wireless communication system; and receiving a first RRC message indicating to the first UE to use a first data radio bearer (DRB) for a proximity-based services (ProSe) communication with a second UE of the wireless communication system, wherein the first DRB is different from a second DRB for communication between the first UE and the network.

The present invention further discloses a method of handling device to device communication for a network in a wireless communication system. The method includes establishing an RRC connection to a first user equipment (UE); and transmitting a first RRC message indicating to the first UE to use a first data radio bearer (DRB) for a proximity-based services (ProSe) communication with a second UE of the wireless communication system, wherein the first DRB is different from a second DRB for communication between the first UE and the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
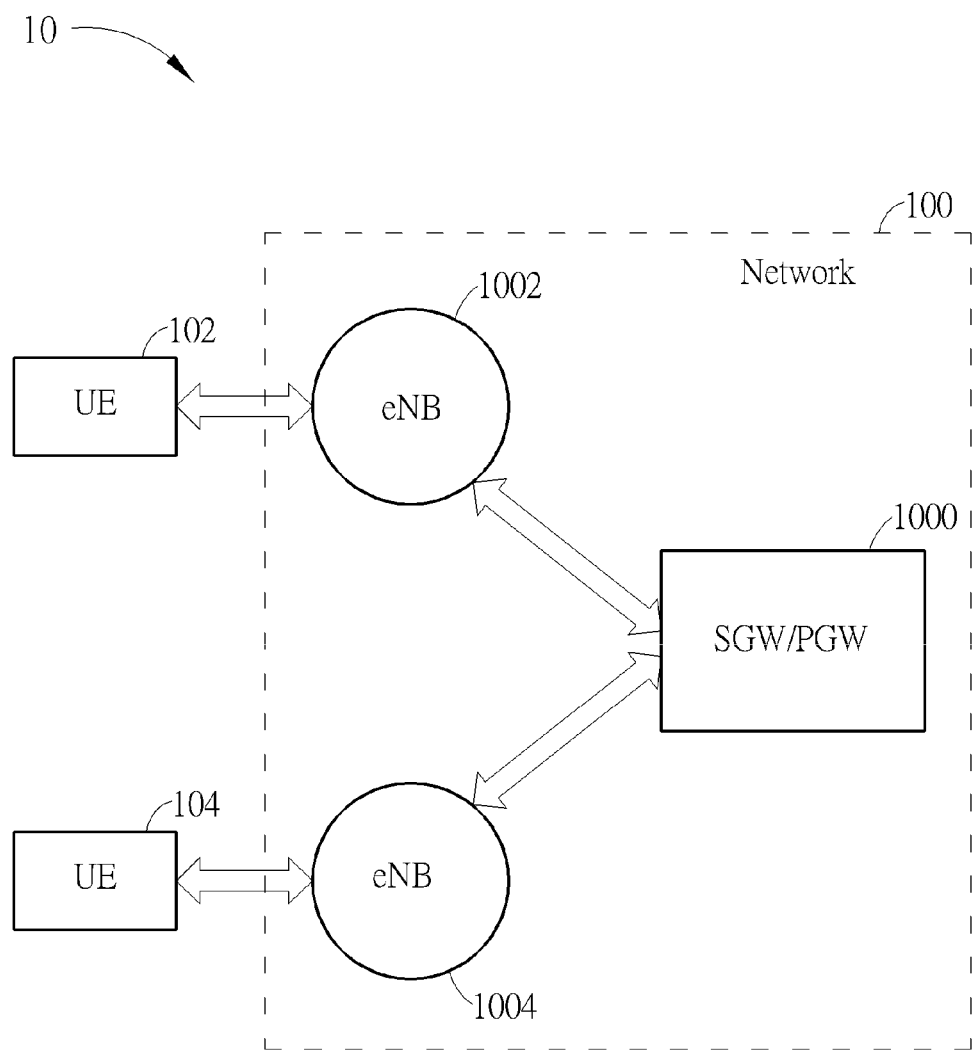
FIG. 1 is a schematic diagram of a wireless communication system according to an example of the prior art.
Figure 2:
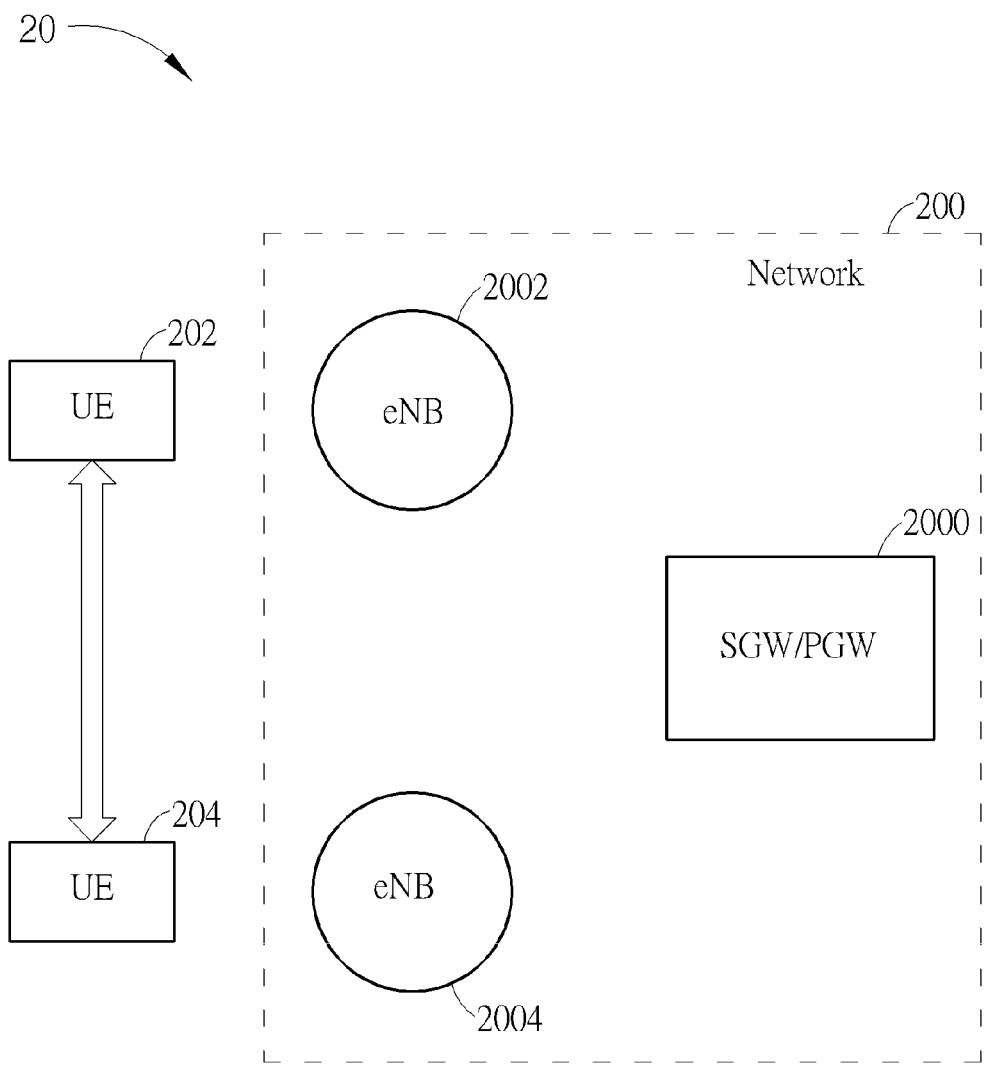
FIG. 2 is a schematic diagram of a wireless communication system according to an example of the prior art.
Figure 3:
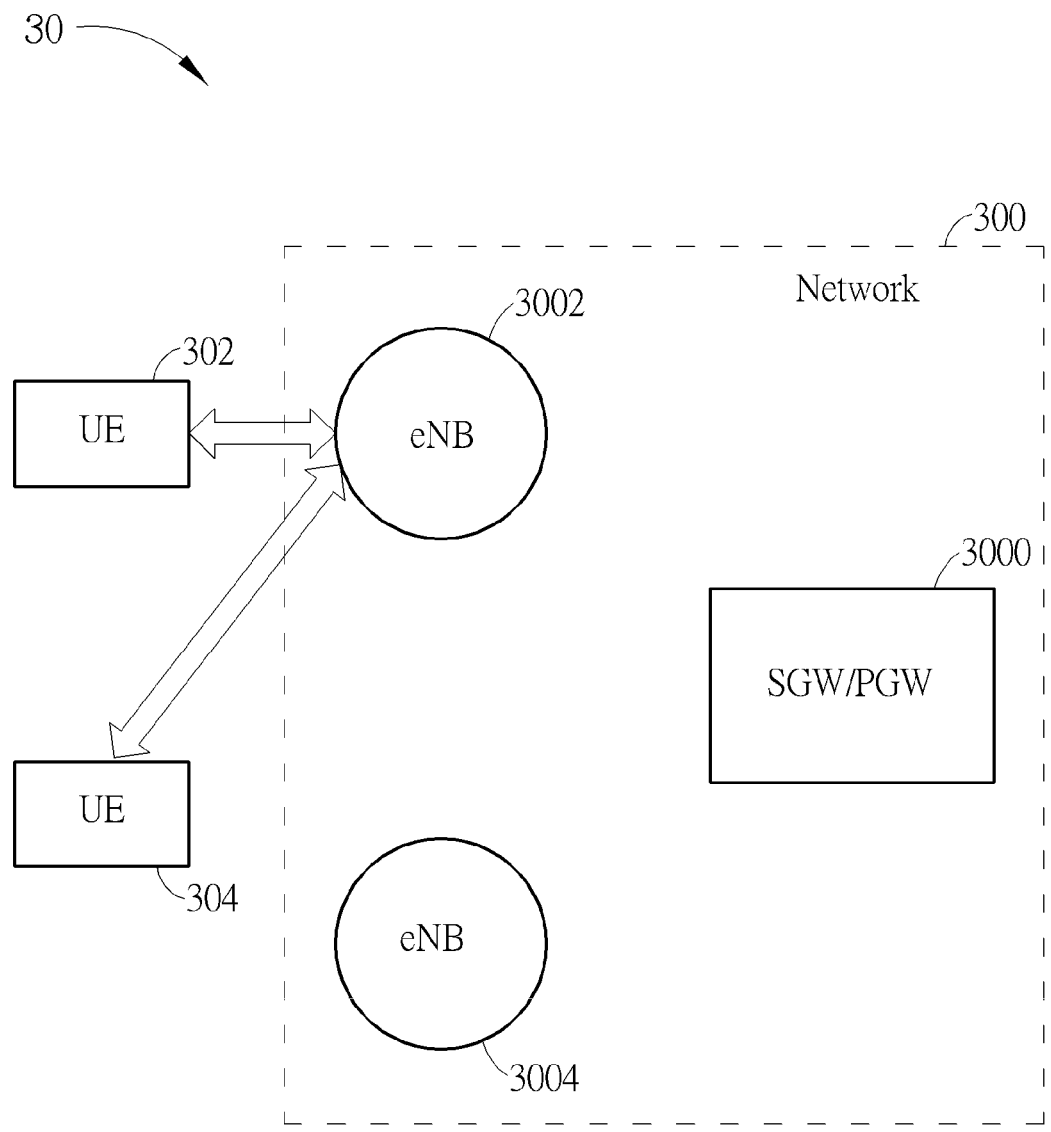
FIG. 3 is a schematic diagram of a wireless communication system according to an example of the prior art.
Figure 4:
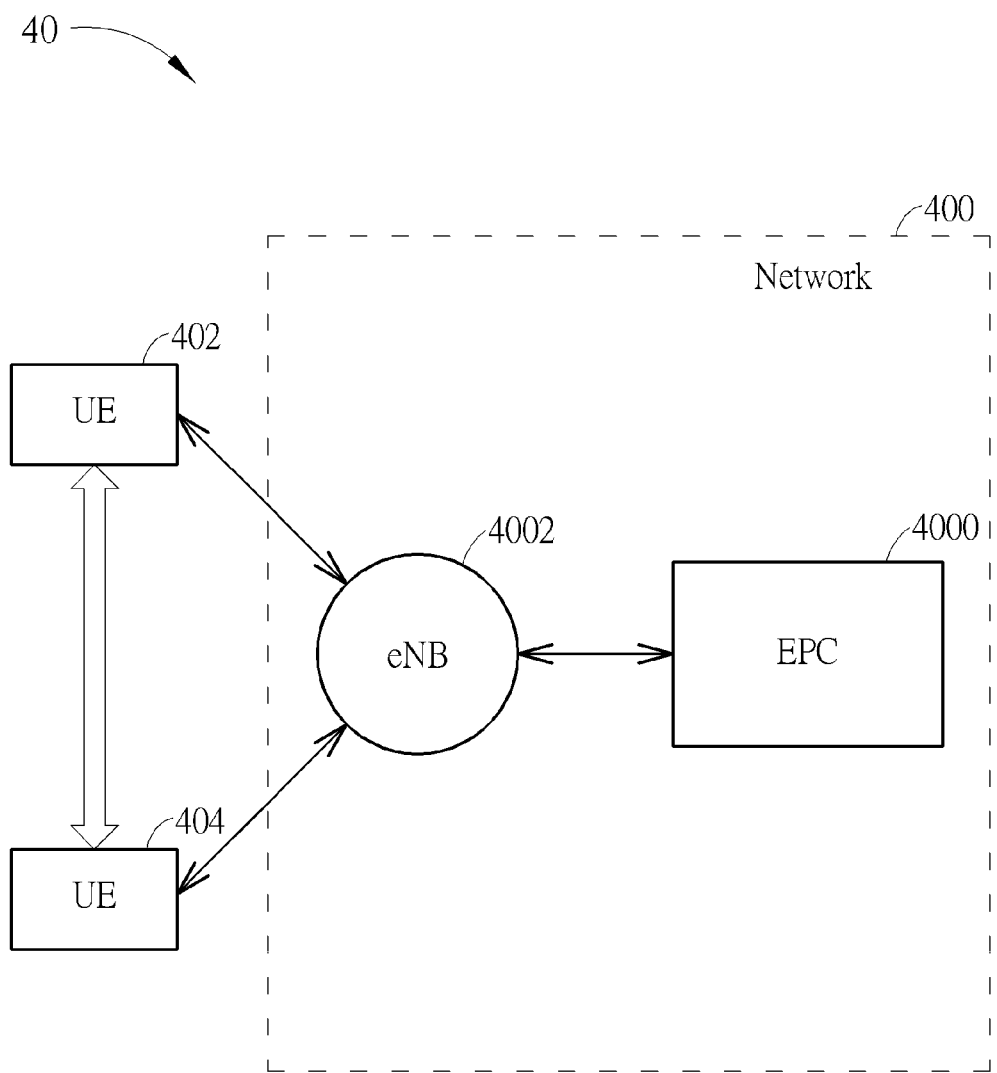
FIG. 4 is a schematic diagram of a wireless communication system according to an example of the present invention.

Please refer to FIG. 4, which is a schematic diagram of a wireless communication system 40 according to an example of the present invention. The wireless communication system 40 is briefly composed of a network 400 and user equipments (UEs) 402 and 404. In FIG. 4, the network 400 and the UEs 402 and 404 are simply utilized for illustrating the structure of the wireless communication system 40. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

The UEs can be portable communication devices for performing speech and data communication through the network such as the UMTS, the LTE system or the LTE-A system. Besides, the network and one of the UEs can be seen as a transmitter or a receiver according to transmission direction, e.g., for an uplink (UL), the communication device is the transmitter and the network is the receiver, and for a downlink (DL), the network is the transmitter and the communication device is the receiver.

Figure 5:
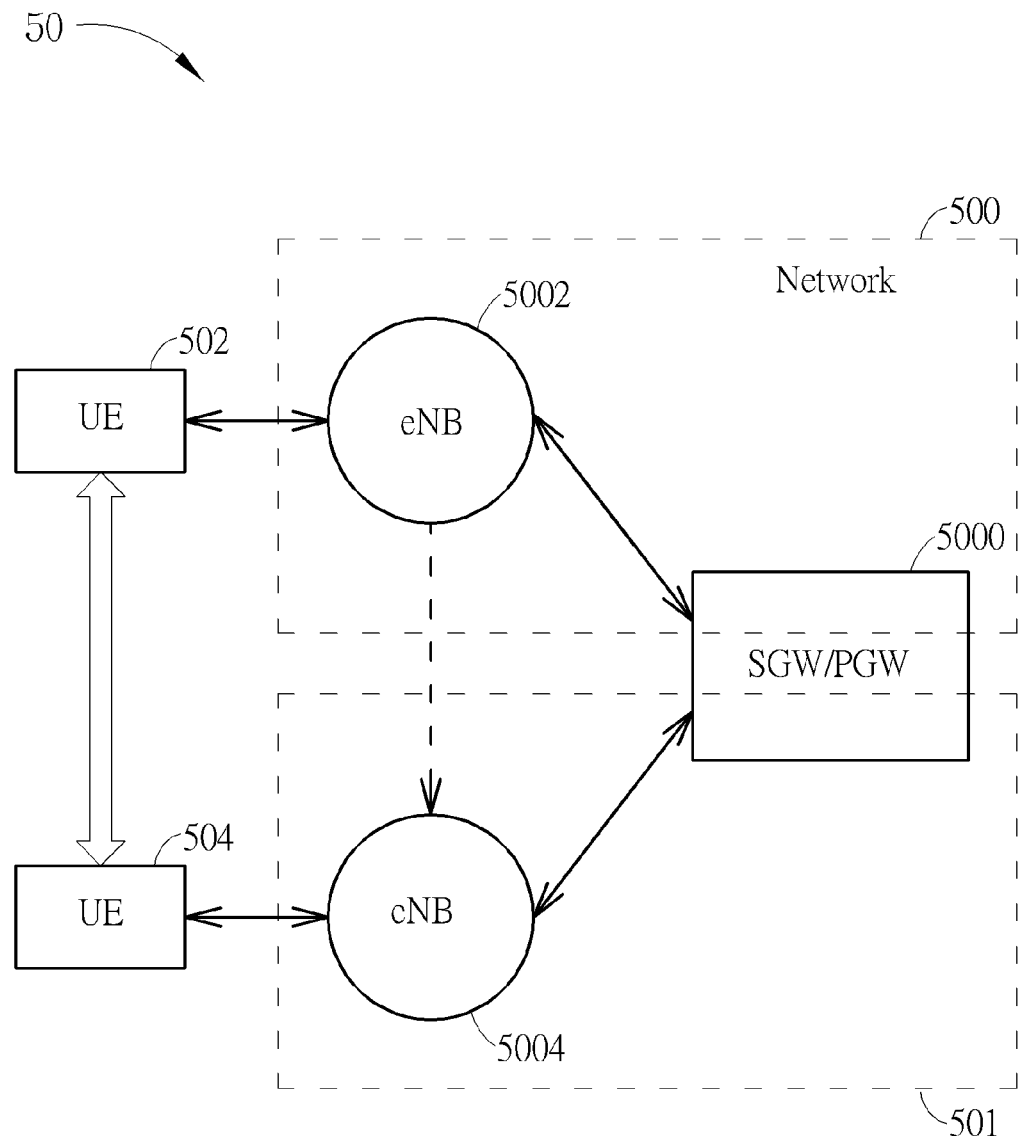
FIG. 5 is a schematic diagram of a wireless communication system according to an example of the present invention.

Note that the base station (e.g. eNB) to which the UEs are connected is not limited to only one base station. In the example of FIG. 4, the UEs 402 and 404 connect with the same eNB 4002 in the network 400. In another example such as FIG. 5, the UEs 502 and 504 may connect with eNBs 5002 and 5004 in the networks 500 and 501 respectively.

Figure 6:
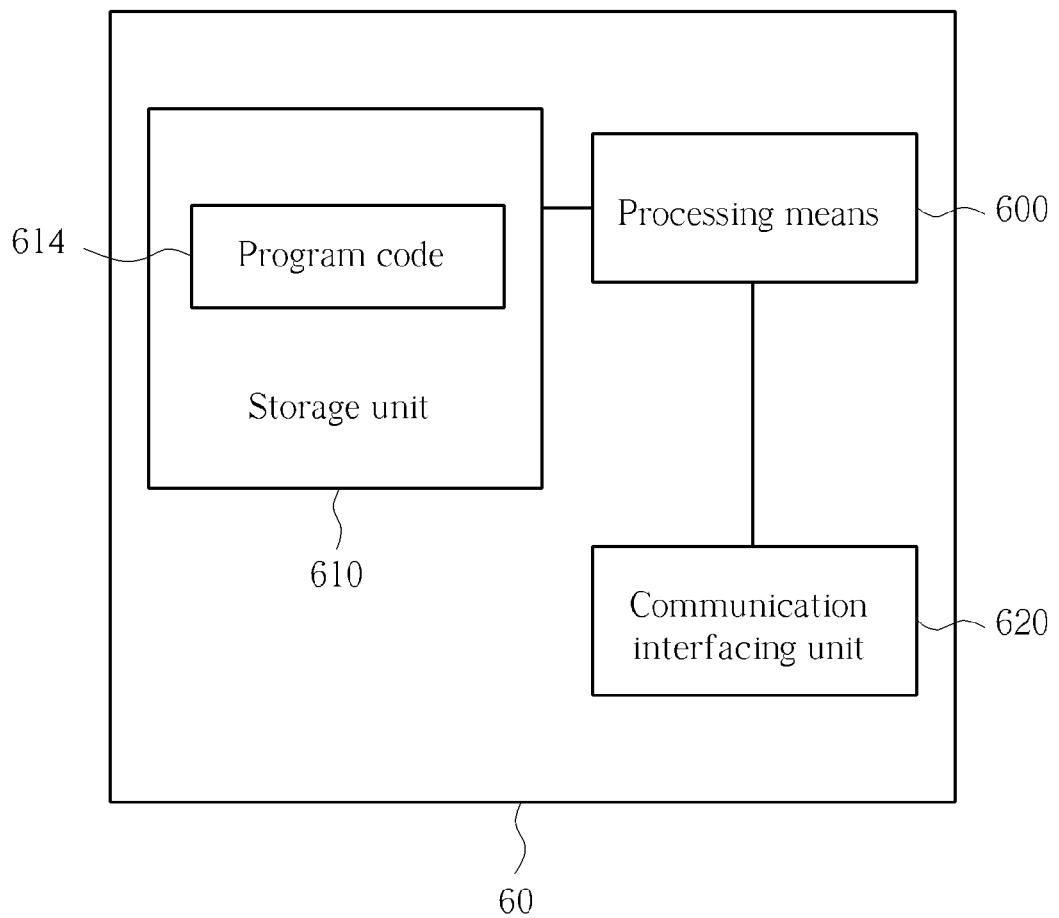
FIG. 6 is a schematic diagram of a communication device according to an example of the present invention.

Please refer to FIG. 6, which is a schematic diagram of a communication device 60 according to an example of the present invention. The communication device 60 can be the network or one of the UEs shown in FIG. 4 and FIG. 5, but is not limited herein. The communication device 60 may include a processing means 600 such as a microprocessor or Application Specific Integrated Circuit (ASIC), a storage unit 610 and a communication interfacing unit 620. The storage unit 610 may be any data storage device that can store a program code 614, accessed and executed by the processing means 600. Examples of the storage unit 610 include but are not limited to read-only memory (ROM), flash memory, random-access memory (RAM), CD-ROM/DVD-ROM, magnetic tape, hard disk and optical data storage device. The communication interfacing unit 620 is preferably a transceiver and is used to transmit and receive signals (e.g., messages or packets) according to processing results of the processing means 600.

Figure 7:
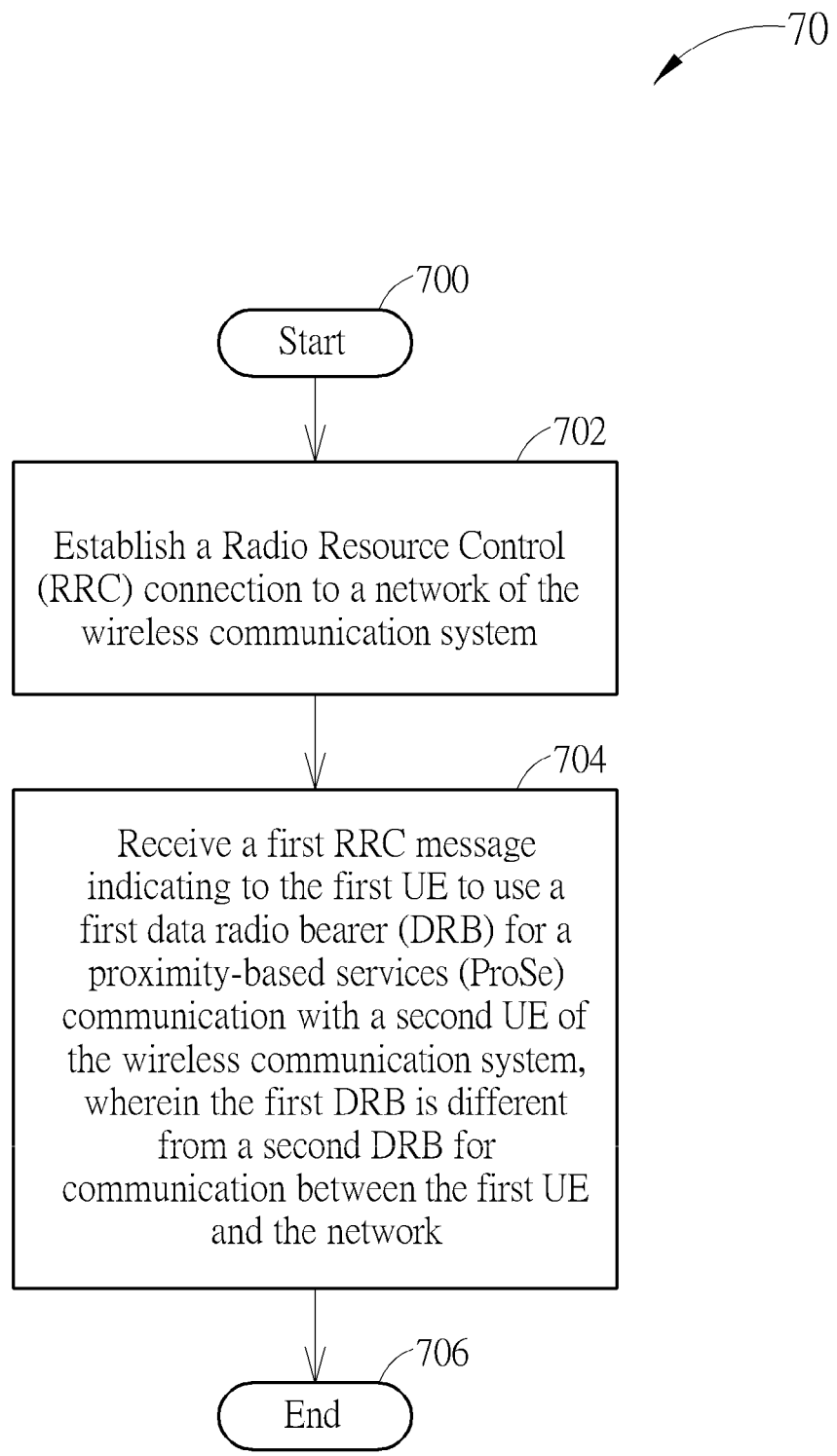
FIG. 7 is a flowchart of a process according to an example of the present invention.

Please refer to FIG. 7, which is a flowchart of a process 70 according to an example of the present invention. The process 70 is utilized for a first UE to handle direct communications, such as device-to-device communications or ProSe communications of direct data path type (which is called ProSe communication in short), in the wireless communication system 40 or 50. The process 70 may be performed by the communication device 60 and may be compiled into the program code 614 to instruct the processing means 600 to execute the following steps:

Step 700: Start.

Step 702: Establish a Radio Resource Control (RRC) connection to a network of the wireless communication system.

Step 704: Receive a first RRC message indicating to the first UE to use a first data radio bearer (DRB) for a proximity-based services (ProSe) communication with a second UE of the wireless communication system, wherein the first DRB is different from a second DRB for communication between the first UE and the network.

Step 706: End.

According to the process 70, the first UE (e.g. UE 402) establishes an RRC connection to a network (e.g. eNB 4002) and receives the first RRC message from the network which indicates that the first DRB is used for the ProSe communication. The first RRC message may further indicate to the first UE to use the second DRB for communication between the first UE and the network (i.e. UE-to-network communication or UE-to-eNB communication). Alternatively, the first UE may receive another RRC message (i.e. a second RRC message) indicating to the first UE to use the second DRB for communication between the first UE and the network. As a result, the first UE uses different DRBs for the ProSe communication and communication between the first UE and the network. In such a situation, the first UE may use the first DRB and the second DRB for different applications (e.g. for voice package transmission or data package transmission) and may prioritize between the first DRB and the second DRB for transmission and data processing.

Furthermore, the first UE may transmit a first buffer status and a second buffer status to the network, wherein the first buffer status indicates the status of uplink buffers of the first UE used for the first DRB, and the second buffer status indicates the status of uplink buffers of the first UE used for the second DRB. Accordingly, the network schedules first uplink grants of the ProSe communication according to the first buffer status and second uplink grants of the UE-to-network communication according to the second buffer status for the first UE. Thus, the first UE may transmit data of the first DRB by using the first uplink grants for the ProSe communication with the second UE, and transmit data of the second DRB by using the second uplink grants for communication with the network. Note that, it is independent that whatever the first UE is acted as a receiver or a transmitter in the ProSe communication and in the communication with the network. In another example, the first UE may be as a transmitter using first uplink grants for ProSe communication, and may also be a receiver using downlink assignments for communication with the network.

In other words, the first buffer status excludes buffer status of data of the second DRB and the second buffer status excludes buffer status of data of the first DRB. Therefore the eNB does not schedule uplink grants more than data volume from the second DRB for transmission in the UE-to-Network communication due to an incorrect buffer status containing sum of data of both the first DRB and second DRB. Similarly the eNB does not schedule uplink grants more than data volume from the first DRB for transmission in the ProSe communication due to an incorrect buffer status report containing buffer status which is sum of data of both the first DRB and second DRB. Besides, data of the first DRB and data of the second DRB are never multiplexed in a transport block.

The first UE may not need to transmit the first buffer status if the eNB does not dynamically schedule the first uplink grants according to buffer status for the ProSe communication. For example, the eNB statically schedules the first uplink grants in some subframes (e.g. two subframes of every radio frame) for the ProSe communication. Note that, the example of the present invention requires the first UE using different DRBs for the ProSe communication with the second UE and the communication with the network. The process 70 is an example of the present invention. Those skilled in the art should readily make combinations, modifications and/or alterations on the abovementioned description and examples. For example, the first buffer status may be sent by an existent buffer status report (BSR) control element format with an existent logic channel ID (LCID) value (i.e. the same value as that for communication with the network) or a new LCID value (i.e. a different value from that for communication with the network), or by a new BSR control element format (i.e. a different BSR control element format from that for communication with the network) with a new LCID value.

In addition, the first uplink grants and the second uplink grants may be transmitted/received in a different manner. The first uplink grants for the ProSe communication may be transmitted on a control channel (e.g. Physical Downlink Control Channel, PDCCH or enhanced PDCCH, EPDCCH) where the second uplink grants are also transmitted, but in different formats. That is, the first UE may receive the first uplink grants in a different format for the ProSe communication than the format of the second uplink grants for communication between the first UE and the network, so as to distinguish from the first uplink grants and the second uplink grants. In another example, the first UE may receive the first uplink grants for the ProSe communication from a control channel (e.g. EPDCCH) different from a control channel used for communication between the first UE and the network (e.g. PDCCH). Furthermore, the first uplink grants for the ProSe communication may be transmitted on a new control channel other than PDCCH and EPDCCH, on a frequency carrier different from a frequency carrier where the second uplink grants are transmitted.

Alternatively, the first uplink grants and the second uplink grants may not be in the same subframe. In other words, the ProSe communication is exclusive from the communication with the network. Such configuration would simplify the UE and network implementation.

Figure 8:
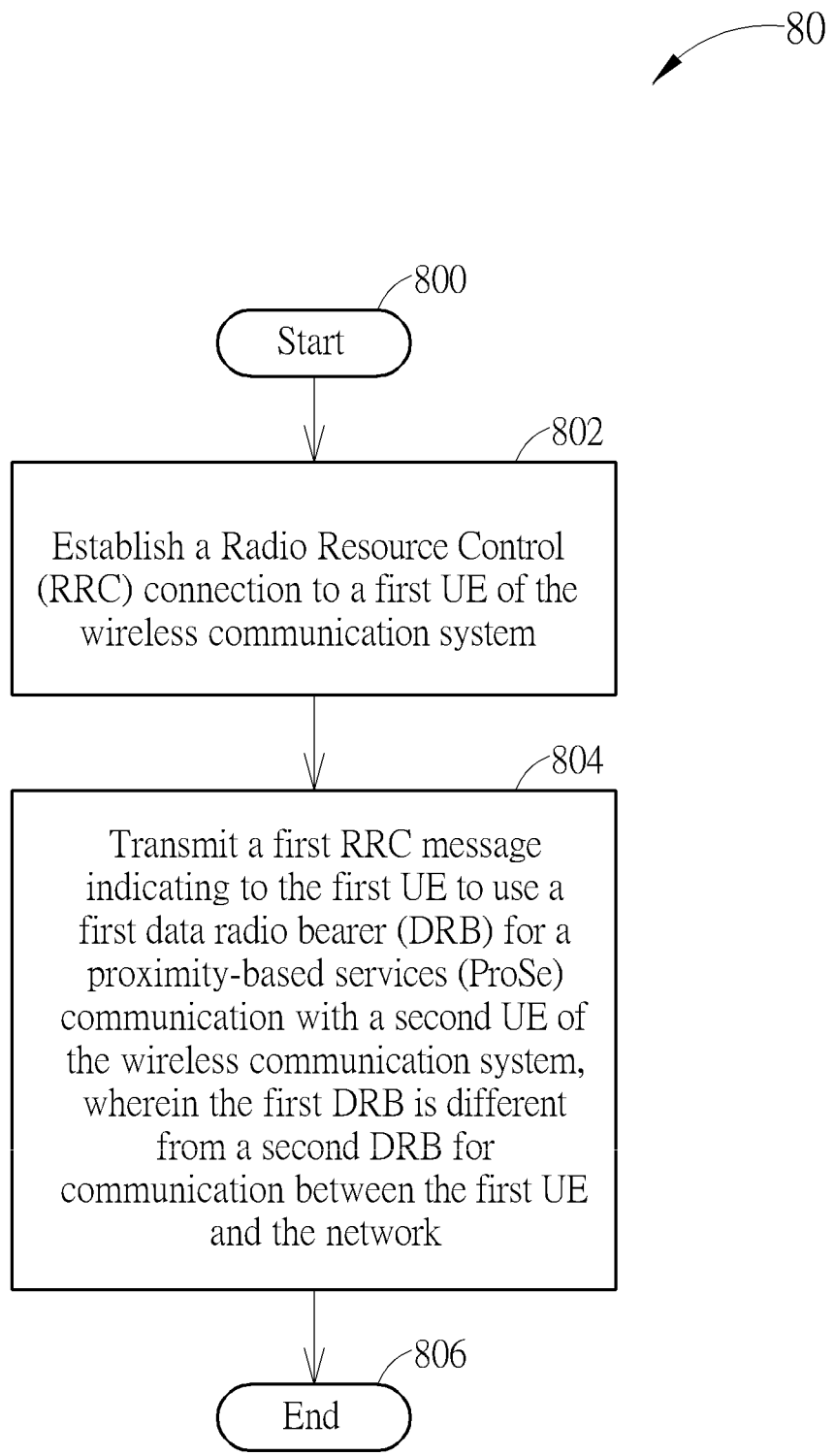
FIG. 8 is a flowchart of a process according to an example of the present invention.

Please refer to FIG. 8, which is a flowchart of a process 80 according to an example of the present invention. The process 80 is utilized for a network, corresponding to the process 70, to handle direct communications for UEs, such as device-to-device communications or ProSe communications of direct data path type (which is called ProSe communication in short) in the wireless communication system 40 or 50. The process 80 is implemented by the communication device 60 and may be compiled into the program code 614 to instruct the processing means 600 to execute the following steps:

Step 800: Start.

Step 802: Establish a Radio Resource Control (RRC) connection to a first UE of the wireless communication system.

Step 804: Transmit a first RRC message indicating to the first UE to use a first data radio bearer (DRB) for a proximity-based services (ProSe) communication with a second UE of the wireless communication system, wherein the first DRB is different from a second DRB for communication between the first UE and the network.

Step 806: End.

The process 80 includes corresponding actions of the process 70 for the network, which can be understood by those skilled from the above mentioned process 70. Those skilled can refer to the descriptions and alterations regarding the process 70. In addition, the network may also indicate to the second UE to use the first DRB for the ProSe communication with the first UE and use a third DRB for communication between the second UE and the network. That is, the third DRB is indicated to the second UE for communication between the second UE and the network. In such a condition, the network may schedule the second UE to receive data of the first DRB by first downlink assignments for the ProSe communication and receive data of the third DRB by second downlink assignments for communication between the second UE and the network. Similarly, it is independent that whatever the second UE is acted as a receiver or a transmitter in the ProSe communication and in the communication with the network. In another example, the second UE may be as a receiver using first downlink assignments for ProSe communication, and may also be a transmitter using uplink grants for communication with the network.

Figure 9:
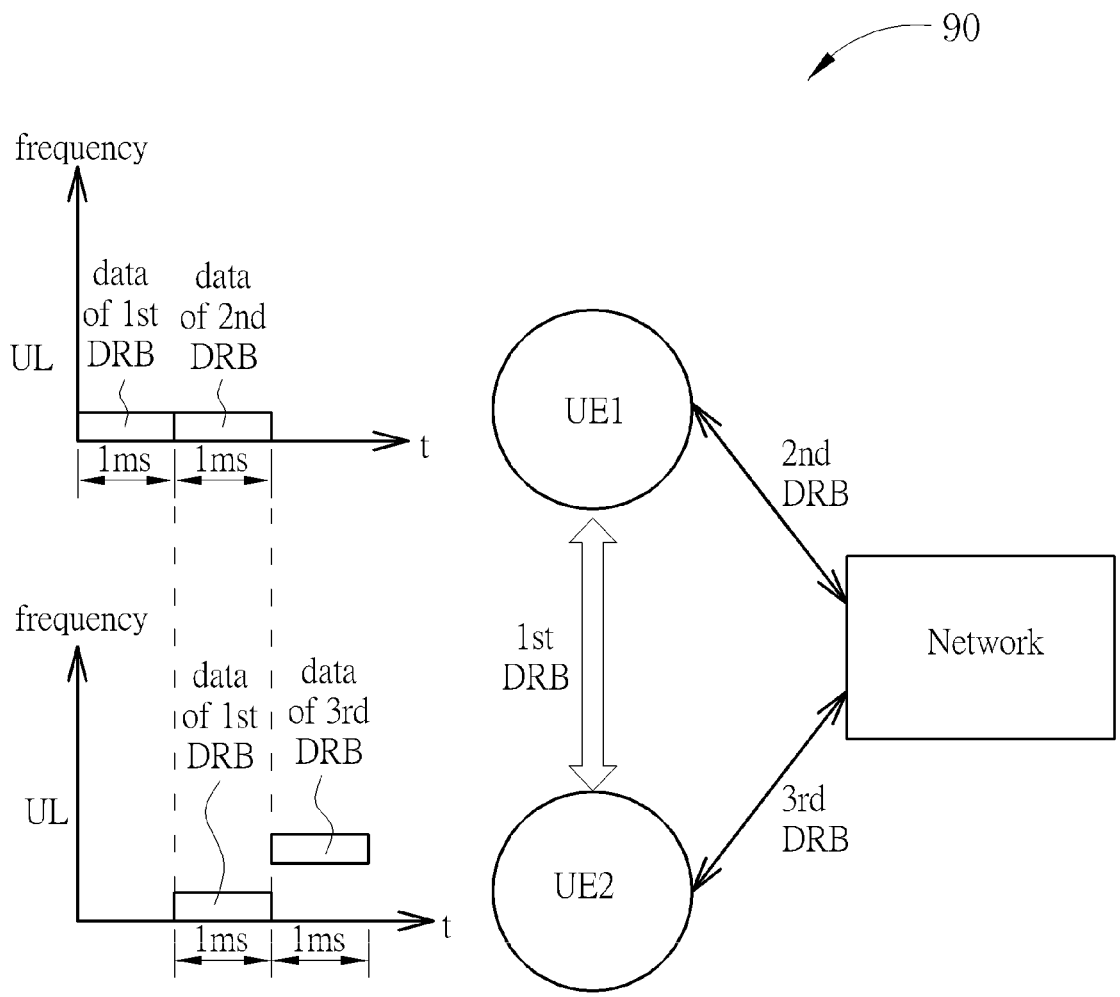
FIG. 9 is a schematic diagram for transmissions in a wireless communication system according to an example of the present invention.

An example of DRBs transmission among the first UE, the second UE and the network is illustrated in FIG. 9. As can be seen from FIG. 9, for UE 1, transport blocks assigned by uplink grants for the first DRB for the ProSe communication and transport blocks assigned by uplink grants for the second DRB for communication with the network are separately scheduled. And for UE 2, transport blocks assigned by downlink assignments for the first DRB and for the third DRB may be scheduled in a similar manner, and thus detailed descriptions are omitted herein.

Furthermore, the first downlink assignments for the ProSe communication may be transmitted in a different format than the format of the second downlink assignments used for communication between the first UE and the network. In detail, the first downlink assignments for ProSe communication are transmitted on a control channel (e.g. PDCCH or EPDCCH) where the second downlink assignments are also transmitted, and in this case, a different PDCCH format may be used for the first downlink assignments for the ProSe communication to distinguish from the PDCCH format used for communication with the network.

In another example, the first downlink assignments for the ProSe communication may be transmitted on a control channel (e.g. EPDCCH) different from a control channel (PDCCH) where the second downlink assignments are also transmitted. The first downlink assignments for the ProSe communication may be transmitted on a new control channel other than PDCCH and EPDCCH, on a frequency carrier different from a frequency carrier where the second downlink assignments are also transmitted.

Alternatively, the first downlink assignments and the second downlink assignments may not be in the same subframe. In other words, the ProSe communication is exclusive from the communication with the eNB. Such configuration would simplify the UE and network implementation.

To sum up, the present invention provides a method for handling device to device communication and communication with the network properly. Compared to the prior art where DRBs are dedicated for communication between the first UE and the network once they are set up, the present invention uses DRBs for different purposes, and the first UE is configured by the network to use the first DRB for the ProSe communication and the second DRB for communication with the network.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling device to device communication for a first user equipment (UE) in a wireless communication system, the method comprising:

establishing a Radio Resource Control (RRC) connection to a network of the wireless communication system;

receiving a first RRC message indicating to the first UE to use a first data radio bearer (DRB) for a proximity-based services (ProSe) communication with a second UE of the wireless communication system, wherein the first DRB is different from a second DRB for communication between the first UE and the network;

transmitting a first buffer status and a second buffer status to the network, wherein the first buffer status indicates a status of an uplink buffer of the first UE used for the first DRB, and the second buffer status indicates a status of an uplink buffer of the first UE used for the second DRB;

receiving, from the network, a first uplink grants for the ProSe communication and second uplink grants for communication between the first UE and the network; and transmitting data of the first DRB by using the first uplink grants and transmitting data of the second DRB by using the second uplink grants;

wherein the first uplink grants and the second uplink grants are not in the same subframe.

2. The method of claim 1, further comprising:

receiving a second RRC message indicating to the first UE to use the second DRB for communication between the first UE and the network.

3. The method of claim 1, wherein the first uplink grants for the ProSe communication are received in a control channel different from where the second uplink grants are received.

4. A method of handling device to device communication for a network in a wireless communication system, the method comprising:

establishing an Radio Resource Control (RRC) connection to a first user equipment (UE);

transmitting a first RRC message indicating to the first UE to use a first data radio bearer (DRB) for a proximity-based services (ProSe) communication with a second UE of the wireless communication system, wherein the first DRB is different from a second DRB for communication between the first UE and the network;

receiving a first buffer status and a second buffer status from the first UE, wherein the first buffer status indicates a status of an uplink buffer of the first UE used for the first DRB, and the second buffer status indicates a status of an uplink buffer of the first UE used for the second DRB; and scheduling first uplink grants of the ProSe communication with the second UE and second uplink grants of communication between the first UE and the network for the first UE;

wherein the first uplink grants and the second uplink grants are not in the same subframe.

5. The method of claim 4, further comprising:

transmitting a second RRC message indicating to the first UE to use the second DRB for communication between the first UE and the network.

6. The method of claim 4, wherein the first uplink grants for the ProSe communication are in a format different from a format used for the second uplink grants used for communication between the first UE and the network.

7. The method of claim 4, wherein the first uplink grants for the ProSe communication are transmitted via a control channel different from that used for communication between the first UE and the network.

8. The method of claim 4, further comprising:

scheduling the second UE to receive data of the first DRB by first downlink assignments for the ProSe communication and receive data of a third DRB by second downlink assignments for communication between the second UE and the network;

wherein the third DRB is indicated to the second UE for communication between the second UE and the network.

9. The method of claim 8, wherein the first downlink assignments for the ProSe communication are in a format different from a format used for the second downlink assignments for communication between the first UE and the network.

10. The method of claim 8, wherein the first downlink assignments for the ProSe communication are transmitted via a control channel different from that used for communication between the first UE and the network.

11. The method of claim 8, wherein the first downlink assignments and the second downlink assignments are not in the same subframe.

* * * * *